United States Patent [19]

Holtmyer et al.

[11] Patent Number: 4,964,467

[45] Date of Patent: Oct. 23, 1990

[54] NON-AQUEOUS VISCOSIFIED CARBON DIOXIDE AND METHOD OF USE

[75] Inventors: Marlin D. Holtmyer; Charles V. Hunt, both of Duncan, Okla.

[73] Assignee: Halliburton Company, Duncan, Okla.

[21] Appl. No.: 417,941

[22] Filed: Oct. 6, 1989

[51] Int. Cl.$^5$ .............................................. E21B 43/26

[52] U.S. Cl. .................................... 166/308; 166/268; 166/271; 166/275; 166/305.1; 166/309; 166/280; 252/8.551

[58] Field of Search ............... 166/268, 270, 271, 308, 166/275, 305.1, 280, 309; 252/8.551

[56] References Cited

U.S. PATENT DOCUMENTS

| | | | |
|---|---|---|---|
| Re.32,302 | 12/1986 | Almond | 166/308 |
| 3,310,112 | 3/1967 | Nielsen | 166/42 |
| 3,396,107 | 8/1968 | Hill | 252/8.55 |
| 3,634,237 | 1/1972 | Crenshaw | 252/8.55 R |
| 3,696,035 | 10/1972 | Nimerick | 252/8.55 R |
| 3,759,674 | 9/1973 | Gregg | 44/7 C |
| 3,765,488 | 10/1973 | Pence | 166/308 |
| 3,898,165 | 8/1975 | Ely . | |
| 3,954,626 | 5/1976 | Greminger | 166/308 |
| 3,980,136 | 9/1976 | Plummer | 166/308 |
| 4,012,327 | 3/1977 | Boothe | 166/308 |
| 4,326,970 | 4/1982 | Cottrell et al. | 166/275 |
| 4,404,111 | 9/1983 | Bi et al. | 252/8.554 |
| 4,406,799 | 9/1983 | Hunter | 166/275 |
| 4,417,989 | 11/1983 | Hunter | 166/280 |
| 4,420,598 | 12/1983 | Morduchowitz . | |
| 4,440,653 | 4/1984 | Briscoe | 166/308 |
| 4,477,360 | 10/1984 | Almond | 166/308 |
| 4,488,975 | 12/1984 | Almond | 252/8.551 |
| 4,502,540 | 3/1985 | Byham | 166/274 |
| 4,519,455 | 5/1985 | Holtmyer | 166/308 |
| 4,554,082 | 11/1985 | Holtmyer | 166/305.1 |
| 4,567,947 | 2/1986 | Mzik | 166/273 |
| 4,575,379 | 3/1986 | Browning | 252/315.3 |
| 4,609,043 | 9/1986 | Cullick | 166/268 |
| 4,627,495 | 12/1986 | Harris | 166/308 |
| 4,673,038 | 6/1987 | Sandiford | 166/270 |
| 4,701,270 | 10/1987 | Bullen | 166/308 |
| 4,780,221 | 10/1988 | Holtmyer et al. | 252/8.551 |
| 4,887,671 | 12/1989 | Stevens, Jr. | 166/308 |

*Primary Examiner*—Bruce M. Kisliuk
*Assistant Examiner*—Roger J. Schoeppel
*Attorney, Agent, or Firm*—Robert A. Kent

[57] ABSTRACT

A method of treating a subterranean formation is provided using a treating fluid comprising from about 0% up to about 80% by volume liquid carbon dioxide. The remainder of the treating fluid comprises a viscous substantially anhydrous liquid which may be crosslinked by a metal ion source. The treating fluid is formed by the addition of polymers or copolymers of dimethylacrylamide to the substantially anhydrous fluid.

23 Claims, No Drawings

NON-AQUEOUS VISCOSIFIED CARBON DIOXIDE AND METHOD OF USE

BACKGROUND OF THE INVENTION

The present invention is directed to a method of treating a subterranean formation penetrated by a well bore utilizing liquid carbon dioxide admixed with a substantially anhydrous, viscosified fluid.

The treatment of subterranean formations penetrated by a well bore to stimulate the production of hydrocarbons or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the well bore at sufficient pressure and flow rate to create a crack or fracture, in the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

Treatment of subterranean formations using carbon dioxide based fluids is also known in the art. Fluids containing carbon dioxide are desirable for certain well conditions because the fluids are believed to be nondamaging. In prior patents, carbon dioxide based fluids have typically been formed in combination with aqueous liquids or substantially anhydrous liquids. Methods of stimulating wells using such carbon dioxide based fluids are described in U.S. Pat. Re. 32,302; 4,519,455; 4,627,495; and 4,554,082 which are herein incorporated by reference.

Aqueous fluids have been traditionally used in conjunction with carbon dioxide because liquid carbon dioxide alone does not have adequate viscosity to effectively treat a well. U.S. Pat. Re. 32,302 discloses methods and fluids for fracturing subterranean formations by utilizing liquid-liquid emulsions of liquified carbon dioxide and an aqueous fluid. The liquid-liquid emulsion contains a surfactant to stabilize the emulsion and the resulting foam when the emulsion is heated above the critical temperature of carbon dioxide. The fluid may also contain a gelling agent, such as a water-soluble synthetic or natural polymer, for additional stability. U.S. Pat. No. 4,627,495 also discloses methods of fracturing subterranean formations using liquified carbon dioxide and an aqueous liquid which contains a surfactant stabilizer.

Certain well conditions require that a substantially anhydrous fluid be used for treatment. U.S. Pat. Nos. 4,554,082 and 4,519,455 disclose methods and compositions for fracturing a subterranean formation using stabilized liquid-liquid emulsion of liquified carbon dioxide and substantially anhydrous liquid. Examples given of substantially anhydrous fluids are kerosene, diesel, light crude oils, and mixtures thereof with glycols.

In U.S. Pat. Nos. 3,765,488 and 3,954,626, methods and compositions of treating a subterranean formation using liquified carbon dioxide and viscosified alcohols are also disclosed. Hydroxyalkyl cellulose and hydroxyalkyl methyl cellulose are used to viscosify essentially anhydrous alcohols having 1 to 3 carbon atoms. The liquified carbon dioxide is admixed with the viscosified alcohol and injected down the well bore. The disclosed treating fluids contain liquified petroleum gas (LPG) and the importance of the mixture ratio of carbon dioxide to LPG to gelled alcohol on the critical properties of the fluid is also disclosed.

U.S. Pat. No. 4,609,043 discloses an enhanced oil recovery process in which liquified carbon dioxide is injected into the oil-bearing formation under supercritical conditions to act as a solvent for the oil. Mobility of the carbon dioxide is controlled by the use of a dissolved polymer whose solubility is enhanced by the use of an "entrainer". The dissolved polymers disclosed are synthetic polymers such as a tactic polybutene and polypropylene oxide, polyvinylethyl ether, poly n-decylacrylate and poly n-laurylmethacrylate. Slightly polar, low molecular weight organic compounds ("entrainer") are disclosed for increasing the solubility of polymers in the carbon dioxide. Preferred entrainers are disclosed, such as alcohols (methanol, ethanol, propanol and butanol), glycols and polyglycols.

In U.S. Pat. No. 4,567,947, fracturing fluid compositions are disclosed comprising at least one substantially anhydrous aliphatic alcohol, a non-ionic homopolymer of polyalkylene oxide and a gel activating agent. Mixing the composition with liquid carbon dioxide in a concentration of from 40% to 80% is also disclosed. The polyalkylene oxide homopolymer disclosed has a molecular weight from about 4 to about 5 million and the gel activating agent is an alkali metal halide or an alkaline earth metal halide.

In general, the fluids or treating fluid compositions discussed above are introduced into the subterranean formation through a well bore. The temperature and pressure of the fluid is controlled to maintain the carbon dioxide in the liquid phase during injection. Once in the well bore, the fluid is slowly heated to a temperature above the critical temperature of carbon dioxide, i.e., about 88° F. As the liquid carbon dioxide undergoes conversion to a gas, a slight increase in the volume of the carbon dioxide occurs. The term "gas" as used herein means a fluid at a temperature equal to or above the critical temperature of the fluid while maintained at any given pressure. Upon conversion of the liquid carbon dioxide to a gas, a stabilized foam is formed spontaneously.

The methods and fluids of the present invention are an improvement over the methods discussed above in many ways. First significant viscosity enhancement of the carbon dioxide is achieved by the fluid of the present invention. Second, a single-phase fluid can be formed with liquid carbon dioxide. Finally, the surprising discovery has been made that high proportions of liquid carbon dioxide are miscible with polymers described herein.

SUMMARY OF THE INVENTION

A method of treating a subterranean formation using a treating fluid comprising from about 0% up to about 80% by volume liquid carbon dioxide with the remainder comprising a viscous, substantially anhydrous liquid which may be crosslinked by a metal ion source. The treating fluid is formed by the addition of polymers or copolymers of dimethylacrylamide to substantially anhydrous, monohydric alcohols. The polymer solutions and gels of the present invention can then be admixed with high proportions of liquid carbon dioxide to form a useful treating fluid for subterranean formations.

DETAILED DESCRIPTION OF THE INVENTION

Treating fluids must generally retain substantial viscosity to be effective for use in oil or gas recovery operations. Carbon dioxide, as a liquid, is a non-polar fluid having extremely low intermolecular forces and accordingly has very low viscosity. Liquid carbon dioxide has a viscosity of about 0.14 centipose at 0° F. and about 0.06 centipose at 80° F. Due to this exceptionally low viscosity, liquid carbon dioxide lacks one of the essential properties of an effective fluid for treating subterranean formations.

Attempts have been made to enhance the viscosity of liquid carbon dioxide by mixing liquid carbon dioxide with viscosified aqueous liquids or viscosified substantially anhydrous liquids. In the present invention, the surprising discovery has been made that a fluid having high proportions of liquid carbon dioxide and a viscosified, substantially anhydrous liquid can be used for treating subterranean formations. The substantially anhydrous liquid is viscosified using polymers and copolymers of dimethylacrylamide. The viscosified, substantially anhydrous liquid is compatible with liquid carbon dioxide and forms a clear, homogeneous treating fluid.

The liquified carbon dioxide is provided from a surface vessel at a temperature and pressure sufficient to maintain the liquid conditions of the normally gaseous carbon dioxide, such as for example, a temperature of about 0° F. and a pressure of about 300 psi. The liquid carbon dioxide generally is admixed with the substantially anhydrous fluid in an amount sufficient to provide a volumetric ratio of liquid carbon dioxide to substantially anhydrous fluid in the range of from about 0.01:1 to about 3:1. Preferably, the ratio is from about 1:1 to 3:1. The actual ratiO utilized will depend upon the required viscosity of the treatment fluid.

The preferred substantially anhydrous fluid comprises monohydric alcohols, such as methanol, ethanol, propanol, isopropanol and butanol. The preferred alcohol is methanol due to its affect on the critical properties of liquified gases. Methanol is also advantageous in that it (1) aids in dehydrating the producing formation and removing interstitial water and (2) plays a role in lowering the temperature at which solid gas hydrates form, thereby reducing plugging of equipment by the solids. The alcohol can comprise up to about 99% of the fracturing fluid volume. The alcohol is miscible with the liquid carbon dioxide and forms a single-phase viscosified fluid. While the preferred alcohols of the present invention are substantially anhydrous, experience has shown that under field conditions 0% to about 2% water in the alcohol may be expected.

The preferred viscosifiers for the substantially anhydrous fluids of the present invention are polymers and copolymers of dimethylacrylamide. These polymers and copolymers possess unique solubility properties in that they are soluble in fluids much less polar than water. The polymers and copolymers can be formed by standard emulsion techniques and are subsequently inverted in the anhydrous fluid to viscosify it.

The preferred polymers and copolymers of the present invention contain dimethylacrylamide as a primary monomer. The non-ionic homopolymer of N,N-dimethylacrylamide (NNDMA) is highly compatible with liquid carbon dioxide and is the most preferred polymer. Based upon viscosity data, the molecular weight of the preferred polymer is believed to be in the range of about 0.5 to about 3 million. For the copolymers, the primary monomer is present in a concentration of about 50 mole percent to about 100 mole percent. Examples of copolymers for use in the present invention are polymers formed with the N,N-dimethylacrylamide and other monomers such as methacrylamidopropyl trimethylammonium chloride (MAPTAC), dimethylaminopropyl methacrylamide (DMAPMA), and 2-acrylamido-2-methylpropane sulfonic acid, sodium salt (AMPS ®, a registered trademark of the Lubrizol Co.). Hydrophobic derivatives of the copolymers formed from N,N-dimethylacrylamide and dimethylaminopropyl methacrylamide are also compatible with liquid carbon dioxide. The hydrophobic derivatives are formed by reacting the copolymer with a fatty acid. An example of a hydrophobic derivative useful in the present invention is the reaction product of oleic acid and poly (dimethylacrylamide-CO-dimethylaminopropyl methacrylamide). Descriptions of polymers and copolymers useful in the present invention are described in the table below.

| Polymer | Description |
|---|---|
| 1 | N,N-dimethylacrylamide (100 mole %) |
| 2 | N,N-dimethylacrylamide (70 mole %)<br>Methacrylamidopropyltrimethyl ammonium chloride (30 mole %) |
| 3 | N,N-dimethylacrylamide (70 mole %)<br>2-Acrylamido-2-methylpropane sulfonic acid, sodium salt (30 mole %) |
| 4 | N,N-dimethylacrylamide (70 mole %)<br>Dimethylaminopropylmethacrylamide (20 mole %)<br>2-Acrylamido-2-methylpropane sulfonic acid, sodium salt (10 mole %) |
| 5 | N,N-dimethylacrylamide (70 mole %)<br>Dimethyylaminopropyl methacrylamide (30 mole %) |
| 6 | N,N-dimethylacrylamide (50 mole %)<br>Dimethylaminopropyl methacrylamide (50 mole %) |

The most preferred polymers and copolymers are solubilized in the substantially anhydrous fluid at a concentration of from about 0.25 to 2.5% on a weight-/volume basis. The preferred concentration is in the range of 0.5% to 1.5%, with the most preferred concentration being about 1.0% polymer on a weight/volume basis.

The surprising discovery has also been made that the substantially anhydrous fluid/polymer solutions of the present invention can be crosslinked using a metal ion source to further increase the viscosity of the treating fluid. Suitable metal ion sources may include, for example, zirconium, titanium, aluminum, and the like. The preferred metal ion source is zirconium. Various forms of zirconium may be utilized such as zirconium oxychloride, zirconium lactate, zirconium acetate, and the like. The zirconium crosslinker is admixed with the substantially anhydrous fluid/polymer solution in an amount of about 0.01% to about 2% by weight. The preferred concentration of zirconium crosslinker is about b 1% by weight. However, the optimal concentration for any metal ion source depends upon the valence state of the metal, the attached ligands, polymer concentration, and other factors.

The viscosified, substantially anhydrous fluid is next combined with the liquid carbon dioxide in the desired ratio. The polymers and copolymers of the present invention generally form single-phase fluids when mixed with liquid carbon dioxide. The most preferred ratio of liquified carbon dioxide to substantially anhydrous liquid is in the range of from about 1:1 to about 3:1. Specific ratios of carbon dioxide to substantially anhydrous liquid which have been found to be suitable for specific polymers and copolymers are provided in the examples. However, other ratios also may be utilized.

For fracturing applications, the proppant material is admixed with the viscous, substantially anhydrous fluid prior to admixing with the liquid carbon dioxide. The admixing of the proppant material with the viscous fluid can be effected in any suitable mixing apparatus, such as for example, a batch mixer or the like. The viscous, substantially anhydrous fluid can transport significant quantities of proppant material to the point of mixing with the carbon dioxide. The proppant material can comprise, for example, sand, graded gravel, glass beads, sintered bauxite, resin-coated sand or the like.

The amount of proppant material admixed with the viscous fluid may be varied to provide the desired amount of proppant in the fluid introduced into the formation. The proppant material can be admixed with the viscous substantially anhydrous fluid in an amount of from about zero pounds of proppant per gallon of viscous fluid up to as many pounds of proppant material per gallon as may be pumped. Depending upon formation reservoir conditions and the specific treatment fluid employed, the amount of proppant material transported by the fluid to the subterranean formation generally can be in the range of from about 0.5 pound to about 15 pounds per gallon of fracturing fluid without a screen out occurring.

The fracturing fluid of the present invention is introduced into the well bore which penetrates the subterranean formation to be treated at a temperature below the critical temperature of the carbon dioxide and at a pressure above the critical pressure of the carbon dioxide. The initial viscosity of the single-phase, viscosified fluid comprising the fracturing fluid is such that the fluid is easily pumped through the well bore, however, the viscosity of the fluid still is sufficient to support a significant quantity of proppant material.

As the fracturing fluid is introduced into the subterranean formation, the fluid slowly is heated to a temperature above the critical temperature of the carbon dioxide (i.e., about 87° F.). The term "supercritical fluid" is used hereafter to mean a fluid containing carbon dioxide at a temperature greater than the critical temperature of the carbon dioxide. When the single-phase, viscosified fluid is heated to a temperature above the critical temperature, the fluid containing the now supercritical carbon dioxide substantially maintains its viscosity. The supercritical fluid is found to continue to transport the proppant material into the fracture formed by the prior introduction of the single-phase, viscosified fluid with at least substantially the same effectiveness as prior to heating above the critical temperature.

After the introduction of the full amount of the calculated or estimated volume of fracturing fluid necessary to fracture the formation and transport the proppant material, the well bore is shut-in for a period of time sufficient to permit stabilization of the subterranean formation. In one embodiment, the well is shut-in for a period of time to permit the formation to at least partially close upon the proppant material and stabilize the fracture volume. The shut-in period can be from several minutes to in excess of about 12 hours and, preferably, is in the range of from about 1 to 2 hours. After the subterranean formation has stabilized, the well is opened under controlled conditions, and the pressure drop in the well bore causes the supercritical fluid to flow back towards the well bore and to exit the well bore at the surface. The carbon dioxide carries from the formation substantially all of the liquids present in the fracturing area which leaves the formation and well clean and ready for the commencement of production.

The following examples are provided to further illustrate the present invention, but are not intended to limit the invention in any way.

EXAMPLE 1

The following experiments show the viscosifying ability of the polymers and copolymers of the present invention in substantially anhydrous fluid.

Polymer solutions were prepared by admixing 1% polymer by weight with substantially anhydrous methanol in a Waring ® Blendor at moderate speed for about 1 minute such that air entrainment is avoided. The viscosity of a 250 ml sample was measured using a Model 35 Fann viscometer. The viscosity valves are reported in Table I.

TABLE I

Solution Viscosities of Synthesized Polymers
1% Polymer Concentration in MeOH

| Mole % Monomer | Mole % Monomer | Mole % Monomer | Apparent Viscosity (cp) at $170 s^{-1}$ |
|---|---|---|---|
| NNDMA (90) | MAPTAC (10) | | 51 |
| NNDMA (70) | DMAPMA (20) | AMPS (10) | 99 |
| NNDMA (70) | TMAEMMS (30) | | 43 |
| NNDMA (90) | TMAEMMS (10) | | 52 |
| NNDMA (70) | TMAEMC (30) | | 56 |
| NNDMA (70) | DMAEM (30) | | 43 |
| NNDMA (70) | MAPTAC (30) | | 57 |
| NNDMA (70) | DMAPMA (30) | | 81 |
| NNDMA (100) | | | 29 |

NNDMA: N,N-dimethylacrylamide
MAPTAC: methacrylamidopropyltrimethylammonium chloride
DMAPMA: dimethylaminopropyl methacrylamide
TMAEMMS: trimethylammoniumethyl methyacrylic methyl sulfate
TMAEMC: trimethylammoniumethyl methacrylic chloride
DMAEM: dimethylaminoethyl methacrylate

EXAMPLE 2

A test apparatus was constructed of a two section-round window cell equipped with a variable speed drive, a four blade prop mixer, a carbon dioxide booster pump, and window back lighting. The capacity of the cell was about 290 ml ±5 ml. The polymers were solubilized in the substantially anhydrous liquid at a concentration of about 1.0% by weight. The desired amount of viscosified alcohol (based on the carbon dioxide ratio) was pulled into the cell with suction. Liquid carbon dioxide was pumped into the top of the cell while mixing the solution until the pressure reached 1000 psi. Remarks were recorded at 1000 psi, 1500 psi and 1750 psi. Test temperature was the temperature of the liquid carbon dioxide.

TABLE II

| Polymer | P | Remarks |
|---|---|---|
| 1:1 Ratio $CO_2$/Viscosified Methanol | | |
| 1 | 1000-1500 | Clear, Homogeneous |
| 2 | 1000-1500 | Clear, Homogeneous after fisheyes |

TABLE II-continued

| Polymer | P | Remarks |
|---|---|---|
| | | dissolved in 5 min. |
| 3 | 1000–1500 | Clear, Homogeneous after fisheyes dissolved in 5 min. |
| 4 | 1000–1750 | Clear, Homogeneous |
| 6 | 1000–1600 | Clear, Homogeneous |
| 1:1 Ratio $CO_2$/Viscosified 2-Propanol | | |
| 1 | 1000–1500 | Clear, Homogeneous after fisheyes dissolved in 5 min. |
| 2:1 Ratio $CO_2$/Viscosified Methanol | | |
| 1 | 1000–1400 | Ppt* initially, cleared with time |
| 2 | 1000–1500 | Ppt |
| 3 | 1000–1750 | Trace Ppt |
| 4 | 1000–1750 | Trace Ppt |
| 5 | 1000–1500 | Ppt |
| 3:1 Ratio $CO_2$/Viscosified Methanol | | |
| 1 | 1000–1750 | Clear, Homogeneous |
| 4 | 1000–1750 | Ppt |
| 1 (2-propanol) | 1000–1750 | Ppt |

*Ppt = precipitate

Due to the method of liquid carbon dioxide introduction and the degree of mixing in the chamber containing the viscosified alcohol, the $CO_2$ to viscosified alcohol ratio can be temporarily in excess of the miscible limits and cause temporary precipitate-type particles. These particles cleared or dissolved with continued mixing and time.

No means were available for measurements of viscosity; however, from visual observations viscosity development was apparent in the carbon dioxide/ alcohol/-polymer mixtures.

EXAMPLE III

Tests were performed to determine the crosslinkability of the polymers of the present invention and the stability of the crosslinked polymers at elevated temperatures. The samples were prepared by admixing the specified percent by weight of the polymer with 100 ml of substantially anhydrous methanol in a Waring® Blendor. The samples were mixed for 2 minutes after which the crosslinker was introduced into the sample from a micropipette with hand mixing or stirring for 15 seconds. The sample then was placed on a Model 35 or Model 50 Fann viscometer depending upon the test temperature. The results of the tests are set forth below:

Test 1

Polymer: NNDMA (70 mole %)—DMAPMA (30 mole %) at 1% by wt.
Crosslinker: Zirconium Acetate -continued

| | | Apparent Viscosity, cp at $170s^{-1}$ Crosslinker Concentration (% by wt) | | |
|---|---|---|---|---|
| Temperature °F. | Time at Temperature (Minutes) | 0% | 0.2% | 1% |
| 80 | 0 | 183 | 184 | 236 |
| 150 | 0 | 114 | 167 | 461 |
| 200 | 0 | 91 | 139 | 249 |
| 220 | 0 | 76 | 115 | 184 |
| 220 | 120 | 58 | 102 | 155(1) |

(1)after 60 minutes at 220° F.

Test 2

Polymer: NNDMA (70 mole %)—DMAPMA (20 mole %)—AMPS (10 mole %) 0.5% by wt.
Crosslinker: Zirconium Acetate

| | | Apparent Viscosity, cp at $170s^{-1}$ Crosslinker Concentration (% by wt) | | |
|---|---|---|---|---|
| Temperature °F. | Time at Temperature (Minutes) | 0% | 0.4% | 1.0% |
| 80 | 0 | 49 | 60 | 60 |
| 100 | 0 | 37 | 37 | 48 |
| 220 | 0 | 17 | 17 | 36 |
| 220 | 30 | 14 | 14 | — |
| 220 | 60 | 13 | 14 | 30 |

Test 3

Polymer: NNDMA (70 mole %)—MAPTAC (30 mole %) at 1% by wt.
Crosslinker: Zirconium Acetate

| | | Apparent Viscosity, cp at $170s^{-1}$ Crosslinker Concentration (% by wt) | |
|---|---|---|---|
| Temperature °F. | Time at Temperature (Minutes) | 0% | 1% |
| 80 | 0 | 45 | 163 |
| 100 | 0 | — | 357 |
| 220 | 0 | — | 279 |
| 220 | 30 | — | 242 |
| 220 | 60 | — | 252 |

The foregoing results clearly demonstrate the ability of the polymers of the present invention to be crosslinked by a metal ion source such as zirconium. Various forms of zirconium may be utilized such as zirconium oxychloride, zirconium lactate, zirconium acetate, and the like. The crosslinked polymers would be expected to enhance the viscosification of a treatment fluid containing carbon dioxide, in comparison to a treatment fluid containing the polymer alone with carbon dioxide.

What is claimed is:

1. A method of treating a subterranean formation penetrated by a well bore comprising:

solubilizing a polymer comprising N,N-dimethylacrylamide in a substantially anhydrous fluid to form a viscosified fluid;

admixing said viscosified fluid with liquid carbon dioxide to form an admixture in which said carbon dioxide is present in an amount sufficient to comprise from about 0% to about 80% by volume of said admixture;

introducing said admixture into said well bore; and treating said subterranean formation with said admixture.

2. The method of claim 1 wherein said substantially anhydrous fluid is selected from the group consisting of monohydric alcohols.

3. The method of claim 1 wherein said polymer is the homopolymer of N,N-dimethylacrylamide.

4. The method of claim 1 wherein said polymer is present in an amount of about 0.25% to about 2.5% based on the volume of the substantially anhydrous fluid.

5. The method of claim 1 wherein said substantially anhydrous fluid is admixed with liquid carbon dioxide in a ratio of from about 1 to 1 to a ratio of about 3 to 1.

6. The method of claim 1 wherein said polymer comprising N,N-dimethylacrylamide is selected from the group consisting of the homopolymer, copolymers with at least one of the following monomers: methacrylamidopropyltrimethyl ammonium chloride, dimethylaminopropyl methacrylamide, 2-acrylamido-2-methyl propane sulfonic acid (sodium salt), trimethylammoniumethyl methacrylic methyl sulfate, trimethylammoniumethyl methacrylic chloride, hydrophobic derivatives of said copolymers, and mixtures thereof.

7. The method of claim 1 wherein said polymer in said substantially anhydrous fluid is crosslinked with a crosslinking agent.

8. A method of treating a subterranean formation penetrated by a well bore comprising:

solubilizing a polymer comprising N,N-dimethylacrylamide in a substantially anhydrous fluid;

admixing said substantially anhydrous fluid/polymer solution with a crosslinking agent;

admixing said solution with a proppant material and liquid carbon dioxide in a ratio so as to maintain a single-phase, viscosified fluid;

introducing said single-phase, viscosified fluid into said well bore and said subterranean formation at a temperature below the critical temperature of carbon dioxide and under sufficient pressure to maintain the carbon dioxide as a liquid; and maintaining said single-phase, viscosified fluid within said formation for a sufficient time to permit said fluid to be heated to a temperature above the critical temperature of carbon dioxide to form a stabilized supercritical fluid.

9. The method of claim 8 wherein said substantially anhydrous fluid is selected from the group consisting of monohydric alcohols.

10. The method of claim 8 wherein said polymer is present in an amount of from about 0.25% to about 2.5% based upon the volume of substantially anhydrous fluid.

11. The method of claim 8 wherein said substantially anhydrous fluid is admixed with liquid carbon dioxide in a ratio of from about 1 to 1 to about 3 to 1.

12. The method of claim 8 wherein said crosslinking agent is selected from the group consisting of compounds providing zirconium ions.

13. The method of claim 8 wherein said polymer consisting of N,N-dimethylacrylamide is selected from the group consisting of the homopolymer, copolymers with at least one of the following monomers: methacrylamidopropyltrimethyl ammonium chloride, dimethylaminopropylmethacrylamide, 2-acrylamido-2-methylpropane sulfonic acid (sodium salt), trimethylammoniumethyl methacrylic methyl sulfate, trimethylammoniumethyl methacrylic chloride, hydrophobic derivatives of said copolymers, and mixtures thereof.

14. A method of treating a subterranean formation penetrated by a well bore comprising:

solubilizing a polymer comprising N,N-dimethylacrylamide in a substantially anhydrous monohydric alcohol to form a viscosified fluid;

admixing said viscosified fluid with liquid carbon dioxide in a ratio so as to form a singlephase, viscosified fluid;

introducing said single-phase, viscosified fluid into said well bore and said subterranean formation at a temperature below the critical temperature of liquid carbon dioxide and a sufficient pressure to maintain the carbon dioxide as a liquid; and maintaining said single-phase, viscosified fluid within said formation for a sufficient time to permit said fluid to be heated to a temperature above the critical temperature of carbon dioxide to form a stabilized supercritical fluid.

15. The method of claim 14 wherein said polymer consisting of N,N-dimethylacrylamide is selected from the group consisting of the homopolymer, copolymers with at least one of the following monomers: methacrylamidopropyltrimethyl ammonium chloride, dimethylaminopropylmethacrylamide, 2-acrylamido-2-methylpropane sulfonic acid (sodium salt), trimethylammoniumethyl methyacrylic methyl sulfate, trimethylammoniumethyl methacrylic chloride, hydrophobic derivatives of said copolymers, and mixtures thereof.

16. The method of claim 14 wherein said substantially anhydrous monohydric alcohol is selected from the group consisting of methanol, ethanol, propanol and butanol.

17. The method of claim 14 wherein said polymer is present in an amount of from about 0.25% to about 2.5%.

18. The method of claim 14 wherein said substantially anhydrous monohydric alcohol is admixed with said liquid carbon dioxide in a ratio of from about 1 to 1 to about 3 to 1 based on liquid volume.

19. A method of treating a subterranean formation penetrated by a well bore comprising:

solubilizing a polymer comprising N,N-dimethylacrylamide in substantially anhydrous methanol to form a viscosified fluid;

admixing said viscosified fluid with liquid carbon dioxide in a ratio so as to form a single phase, viscosified fluid;

introducing said single-phase, viscosified fluid into said well bore and said subterranean formation at a temperature below the critical temperature of liquid carbon dioxide and sufficient pressure to maintain the carbon dioxide as a liquid; and maintaining said single-phase, viscosified fluid within said formation for a sufficient time to permit said fluid to be heated to a temperature above the critical temperature of carbon dioxide to form a stabilized supercritical fluid.

20. The method of claim 19 wherein said polymer consisting of N,N-dimethylacrylamide is selected from the group consisting of the homopolymer, copolymers with at least one of the following monomers: methacrylamidopropyltrimethyl ammonium chloride, dimethylaminopropylmethacrylamide, 2-acrylamido-2methylpropane sulfonic acid (sodium salt), trimethylammoniumethyl methyacrylic methyl sulfate, trimethylammoniumethyl methacrylic chloride, hydrophobic derivatives of said copolymers, and mixtures thereof.

21. A method of treating a subterranean formation penetrated by a well bore comprising:

solubilizing a polymer comprising N,N-dimethylacrylamide in substantially anhydrous methanol to form a viscosified fluid;

admixing said viscosified fluid with a crosslinking agent;

admixing said viscosified fluid and liquid carbon dioxide in a ratio so as to maintain a single-phase, viscosified admixing said single-phase, viscosified fluid with a proppant material;

introducing said single-phase, viscosified fluid into said well bore and said formation at a temperature below the critical temperature of carbon dioxide and a pressure to maintain the carbon dioxide as a liquid; and maintaining said single-phase, viscosified fluid within said formation to permit said fluid to be heated to a temperature above the critical temperature of carbon dioxide to form a stabilized supercritical fluid.

22. The method of claim 21 wherein said polymer consisting of N,N-dimethylacrylamide is selected from the group consisting of the homopolymer, copolymers with at least one of the following monomers: methacrylamidopropyltrimethyl ammonium chloride, dimethylaminopropylmethacrylamide, 2-acrylamido-2-methylpropane sulfonic acid (sodium salt), trimethylammoniumethyl methyacrylic methyl sulfate, trimethylammoniumethyl methacrylic chloride, hydrophobic derivatives of said copolymers, and mixtures thereof.

23. The method of claim 21 wherein said crosslinking agent is selected from the group consisting of zirconium oxychloride, zirconium lactate, and zirconium acetate.

* * * * *